United States Patent [19]

Bross et al.

[11] Patent Number: 4,483,718
[45] Date of Patent: Nov. 20, 1984

[54] METHOD AND APPARATUS FOR CLEANING MACHINED PARTS

[75] Inventors: Erwin Bross, Asperg; Franz Staudinger, Berglen-Höslinswart; Theodor J. Tüchler, Hemmingen, all of Fed. Rep. of Germany

[73] Assignee: Robert Bosch GmbH, Stuttgart, Fed. Rep. of Germany

[21] Appl. No.: 466,508

[22] Filed: Feb. 15, 1983

[30] Foreign Application Priority Data

Feb. 18, 1982 [DE] Fed. Rep. of Germany ....... 3205816

[51] Int. Cl.³ .............................................. B08B 3/10
[52] U.S. Cl. .................................. 134/25.1; 134/25.4; 134/83
[58] Field of Search ................... 134/25.4, 17, 31, 75, 134/83, 140, 141, 32, 30, 40, 11, 25.1

[56] References Cited

U.S. PATENT DOCUMENTS

| | | | |
|---|---|---|---|
| 1,944,607 | 1/1934 | Millan et al. | 134/32 |
| 2,851,044 | 9/1958 | Davis | 134/83 |
| 4,090,698 | 5/1978 | Mucha et al. | 134/83 |

FOREIGN PATENT DOCUMENTS 906965 9/1962 United Kingdom ............... 134/141

*Primary Examiner*—S. Leon Bashore
*Assistant Examiner*—Michael K. Boyer
*Attorney, Agent, or Firm*—Frishauf, Holtz, Goodman & Woodward

[57] ABSTRACT

The same baskets are used to dip successive batches of parts into a path of cleaning fluid or the like, and between dips the baskets are raised to a position in which rails on which the parts are held in the baskets connect with intermediate rail pieces to form a continuous track so that the contents of each basket can be advanced to the next basket (or to the unloading station in the case of the last basket) while a new batch of parts is loaded into the first basket. The transfer operation is performed by a rake mechanism. The advantage is obtained that when the baths of cleaning fluid are at different temperatures, heat is not wasted in warming up and cooling the baskets and, furthermore, cleaning fluid is not lost by being carried away by baskets moving through the system.

11 Claims, 6 Drawing Figures

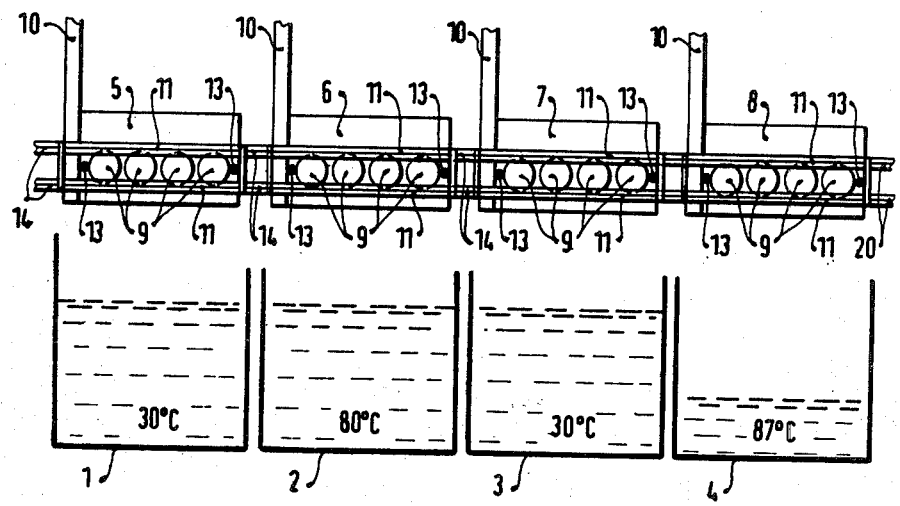
FIG. 1
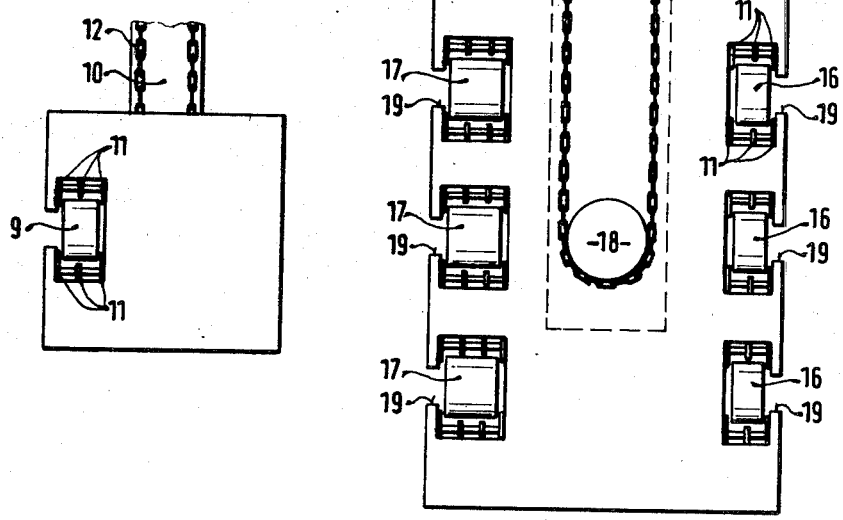
FIG. 2
FIG. 3

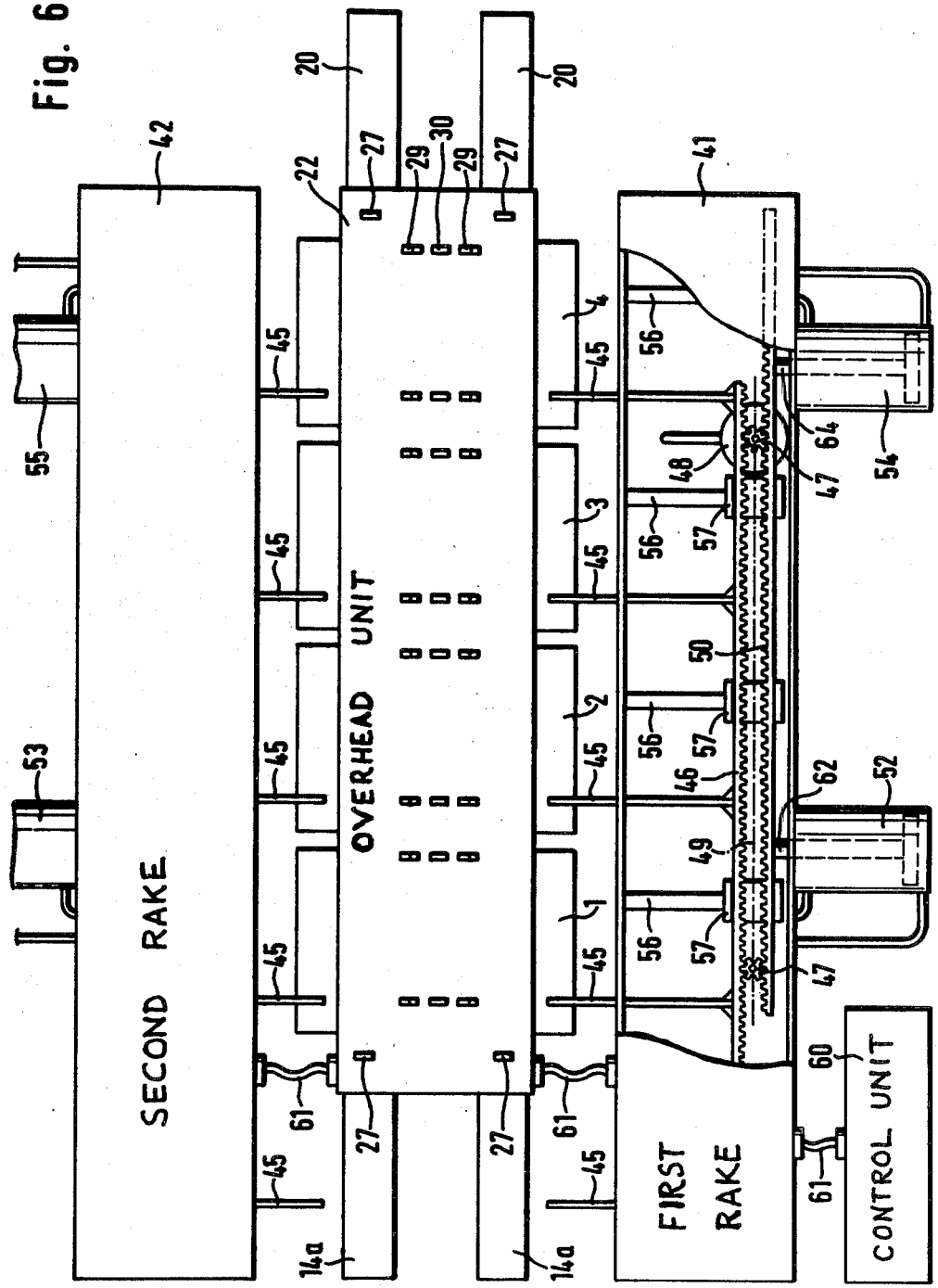

METHOD AND APPARATUS FOR CLEANING MACHINED PARTS

This invention concerns a method and apparatus for cleaning machined parts by running them through a series of dips into various baths, typically composed of a solvent for oil, such as trichlorethylene, maintained at different temperatures, the last bath being in the solvent vapor. In such methods, the parts are held in a basket which is lowered into the bath and sometimes moved around in the bath, after which the basket with the parts is then raised.

Batches of parts made in production quantities for engines and other machines into which they are to be assembled undergo machining a number of times during the course of manufacture and in these steps, oil is applied to the part as a tool removes slivers or particles of material from the blank in order to provide the necessarily precise shape. Between each such step of manufacture, the parts must be run through a cleaning facility which frees the individual parts of oil and any adhering slivers or particles of removed material.

In such cleaning operations the individual parts are usually collected in special cases or mounted on frames and then brought to a central cleaning installation which can also be put into operation from other stations of the assembly line.

Such a cleaning installation as heretofore known consists of several stages, for example a first stage in which the parts are dipped in trichlorethylene held at room temperature, then in trichlorethylene at about 80° C., then again in trichlorethylene at room temperature and finally are dried in trichlorethylene vapor at a last station of the installation. If then the individual parts are laid in baskets or in open-work cases, or are mounted on frames, these transporting devices must in each case be heated up and cooled down, which signifies an unnecessary using up of energy and, in addition, also relatively large entrainment losses to the various baths, as liquid brought along from one bath into the next, since the baskets cannot normally be fully emptied of liquid. Furthermore, the material flow through such a central cleaning installation becomes interrupted and relatively large paths of the individual parts located in the transporting devices must be accepted as a cost of the operation. After passing through the cleaning installation the parts must be taken out of the baskets or removed from the frames and put into the next machining device. The open-work cases or frames, hereinafter collectively referred to as baskets (although they are normally rigid) must then be transported back to the output end of the previous machining station in order to pick up a new batch of parts.

SUMMARY OF THE INVENTION

It is an object of the present invention to provide a method and apparatus for cleaning individual parts in the course of manufacture which will avoid the repeated heating up and cooling down of transporting devices such as baskets, open-work cases and frames, and will reduce the amount of liquid carried along from one bath to the next, while at the same time making it practical to "automate" the cleaning process. It is a further object of the invention to provide a cleaning installation for such a method of parts cleaning which is relatively compact.

Briefly, each basket which is used for holding the parts while they are cleaned is used for lowering the parts into, and raising them from, only a single bath. Between each dip cycle in which the parts are lowered, exposed to cleaning action and then raised, batches of parts are automatically transferred from one basket to the next and thereby advanced from one dip station to the next, after which the dipping of the parts in the baskets at all stations is repeated. A loading station precedes the first dip station and likewise an unloading station follows the last dip station.

The conveyor system for material flow in manufacture provides for the supplying of the parts automatically to a magazine after they run through the entire cleaning installation and from this magazine the parts can be automatically introduced into the next production operation in suitable holders maintaining them in appropriate orientation and position. The heretofore conventional central cleaning installations in the form of carousel or linear cleaning equipment, which require very much space, become superfluous, so that no such long paths need any longer be followed by the parts to be machined.

In a particularly convenient embodiment, the parts are held on rail-like guides into which they can be introduced at one end, moved through dip stations, one after the other, and likewise removed from the other end, these rail-like guides being provided in the basket structure. The fixed portion of the installation has guide segments of a similar nature mounted so that when the baskets are in their raised position a continuous track is provided, facilitating the movement of a complete batch of parts from each basket to the next, while loading the first basket and unloading the last. It is particularly advantageous to provide the individual baskets with means for executing rotary or reciprocating motion in the treating liquid and to provide a chain drive on the raising and lowering arm of the basket by which a rocking motion can be driven.

BRIEF DESCRIPTION OF THE DRAWINGS

The invention is further described below by way of illustrative example with reference to the annexed drawing, in which:

FIG. 1 is a diagrammatic side elevation view of the parts most essential to the invention of a cleaning installation embodying the invention:

FIG. 2 is a schematic end view of one of the baskets of the installation of FIG. 1;

FIG. 3 is a schematic cross-sectional view of a modified form of basket for use in an apparatus like that of FIG. 1;

FIG. 6 is a schematic plan view of the apparatus of FIGS. 1 and 4.

DESCRIPTION OF THE ILLUSTRATED EMBODIMENTS

Figure 4:
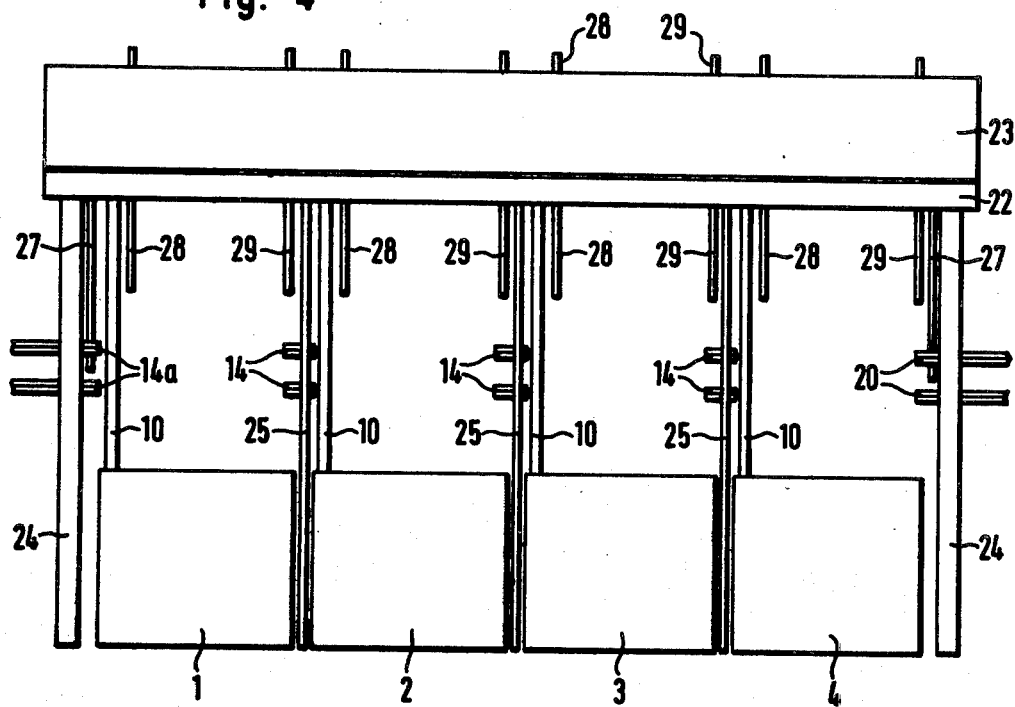
FIG. 4 is a schematic side view of the apparatus of FIG. 1 with the baskets in their lowered position.

FIG. 1 diagrammatically shows a machined part cleaning installation utilizing four cleaning fluid containers 1 to 4. In the containers 1,2 and 3 there is enough trichlorethylene to allow the parts to be cleaned to be immersed in trichlorethylene when the baskets 5,6 and 7 are lowered to their lowest positions. In container 4, the trichlorethylene is provided only on the bottom of the container, so that the parts held in the basket 8 when that basket is lowered into the container 4 will come into contact only with the trichlorethylene vapor. The cleaning fluid in the container 1 has a temperature of 30° C., in order to remove the water-oil emulsion from the parts and also substantially all the water that may be present. The cleaning fluid in container 2 has a temperature of 80° C., in order to make possible the complete removal of the oil. The cleaning fluid in container 3, like that in container 1, has a temperature of about 30° C. in order to provide final washing and particularly to cool down the parts, so that when they are dipped into container 4, in which they are to be cleaned with trichlorethylene vapor, a longer condensation period will be made possible.

As already mentioned, the baskets 5 to 8 belong respectively to the containers 1 to 4. These baskets hold the parts 9 to be treated. Each of the baskets 5 to 8 is fixed on a vertical arm 10 which is raised and lowered by an overhead mechanism 22,23 (FIG. 4) so that the baskets can be lowered from the position shown in FIG. 1 into the cleaning fluid containers 1,2,3 and 4 respectively.

Within the baskets the parts 9 are arranged between rails 11 that can for example be made of sheet iron or steel, preferably in such a way that on one side they are securely guided and held and on the other they are movable without great expenditure of force.

As shown in FIG. 2, in each of the arms 10 there runs a chain 12 which makes it possible to rock the baskets 5 to 8 in rotary movement, at the same time that an oscillatory movement of all baskets 5 to 8 is preferably provided as well, in order to obtain a uniform cleaning effect. In order that the parts 9 should not be able to fall out of the baskets 5 to 8 during the cleaning process, they are secured in the baskets by arresting rods 13. Between the baskets 5 to 8 there are connecting rail pieces 14 that are fixedly mounted in the frame of the installation (see FIG. 4), so that when the baskets are in the raised position shown in FIG. 1, and the arresting rods 13 are removed, the parts can be displaced along the rails from one basket to another. At the input side of the installation, ahead of the basket 5, there is likewise a loading rail section 14a, while at the output, beyond the basket 8, there is provided an unloading rail section 20, these likewise being fixed on the frame of the machine.

In FIGS. 1 and 2, the merely schematic representation shows the individual parts 9 arranged in a single layer and, indeed, only along one side of the basket.

FIG. 3 shows a basket 15 in which two different kinds of parts 16 and 17 can be handled by the machine, with each of the two kinds arranged in three levels, one above the other. FIG. 3 also shows the arm 10 as well as the chain 12, the latter passing around a rotary axle 18 that provides the rocking rotary motion already described. FIG. 3 also shows the slots 19, the significance of which is further described below.

In the condition shown diagrammatically in FIG. 1, the baskets 5 to 8 are in their highest position. They are all lowered together in the rhythm of a cycle in which the entire installation participates, the respective baskets going down into their various containers to expose the parts to contact with the cleaning fluid or, in the case of the container 4, the vapor. After a suitable period determined by the machine cycle, the baskets are lifted back into the position shown in FIG. 1. The arresting rods 13 are removed, for example by a mechanism such as that shown in FIG. 5, and the rods of a transfer rake, for example of the kind illustrated in FIG. 6, are inserted in their place. Following the insertion of the rake rods, the rake mechanism shifts to the right, so that the parts 9 are moved out of the basket 5 into the basket 6, another batch is moved from the basket 6 into the basket 7, still another from the basket 7 into the basket 8 and finally the batch in the basket 8 are moved out onto the unloading rails 20. At the same time another rake rod advances parts from the input magazine 14a into the basket 5.

The broad slots 19 shown in FIG. 3 make it possible for the rods of the transfer rake to displace the parts (9, 16 or 17) in the described manner from basket to basket.

After the transfer rake has performed the advancing of the batches of parts 9 by one step, the rods of the rake are withdrawn and the arresting rods 13 are replaced. The transfer rake is then moved back into its original position so that it will be ready to function again in the next cycle.

Since the arrangement of the rails 11 in the basket and the transition pieces 14, as well as the loading rails 14a and the unloading rails 20 will naturally be different from one kind of parts to another and each type of parts must be fitted by suitable rails, it is clear that the utility of the method and apparatus here described is limited to those cases in which identical parts are handled in production quantities. Furthermore, the number of parts located in one level of a basket depends on the size of the parts relative to the size of the basket, and from the aggregate throughput, which in turn depends upon the kind of processing stations that precede and follow the cleaning installation. It is to be understood that the parts can be automatically loaded and unloaded by means not shown, onto the receiving rails 14a and off the unloading rails 20.

As already explained above, in the process of the invention only the parts that are handled are heated up and cooled down, since only the parts themselves are transferred from one cleaning station to the next and an individual basket is assigned to each cleaning station, so that this basket essentially remains at the same temperature. In contrast thereto, in conventional cleaning installations, the transporting devices for the individual parts, such as open-work boxes or frames, are carried through the entire cleaning installation along with the individual parts, so that these transport devices themselves must also be heated up and cooled down. Calculation has shown that on the basis of this difference, up to 70% of the energy required for a conventional cleaning installation can be saved by the practice of the present invention. In the conventional cleaning installations there also occur large entrainment losses of solvent, which can be reduced up to 50% by the practice of the present invention. The invention has the advantage that it can be operated in step with the conveyor system and the various manufacturing operations, so that the cleaning operation can be fully brought into the automatic rhythm of the rest of a highly automated production installation.

Figure 5:
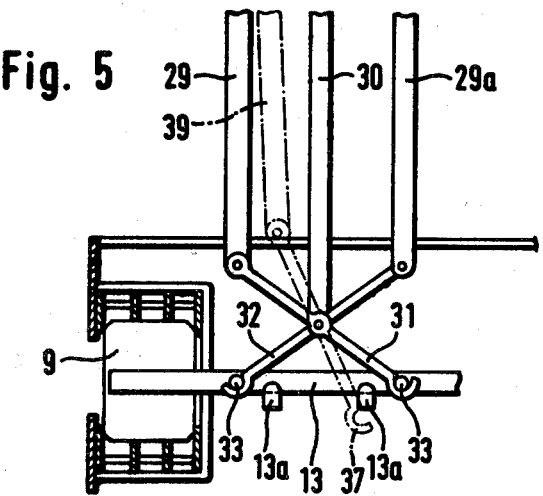
FIG. 5 is a schematic view of the means for removing and replacing the retaining rods in these baskets.

FIG. 4 is a side view of the installation of FIG. 1 showing the overhead mechanism 22,23 and its supports 24 and 25 and showing the apparatus with the baskets lowered by their respective arms 10 into the containers 1,2,3 and 4. The fixed transition rails 14 attached to the support 25 are shown and also the loading and unloading rails 14a, 20 attached to the supports 24. There are also shown a set of rods 28,29 for removing the arresting rods 13 of the baskets when the baskets are in their raised positions, preparatory to transfer of batches of parts by the rake mechanism shown in FIG. 6. FIG. 5 shows for the rods 29 a suitable mechanism for removing the arresting rods 13.

A gate 27 is shown in its lowered position for arresting parts that are loaded on the loading rails 14a while the baskets are in their lowered positions.

The overhead mechanism of the unit 22,23 is also designed to shift the entire mechanism 23 on its base 22 to the right of its position shown in FIG. 4 for a small distance and back again in a reciprocating movement in order to produce a reciprocating movement of the baskets by means of their suspension arms 10. It is to be understood that the baskets can be suspended at both ends rather than only at one end if desired.

FIG. 5 shows one of the arresting rods 13 about to be removed by a combination of the rods 29–32 which are so close to being aligned as seen from the side, as in FIG. 4, that only a single rod is shown there to simplify the drawing. Just before the parts are advanced in batches from one basket to the next, the rods 29,30 and 29a are put into the position shown in FIG. 5 and are then raised all together so as to lift the arresting rod 13 out of its basket. When the transfer operation is completed, the arresting arms 13 are replaced and seated on brackets 13a of the basket which are designed not to interfere with the mechanism shown in FIG. 5. Then the arms 29,30 and 29a are then lowered somewhat more than shown in FIG. 5, after which the arm 30 is held in place while the arms 29 and 29a are raised causing the oblique cross-arms 31 and 32 to swing closer to the axis defined by the arm 30 (see dashed lines showing the positions 37 and 39 of the arms 31 and 29 at that stage). After that the arms 29,30 and 29a can all be raised together without picking up the arresting rod 13. Of course other methods of operating the rod 13 are also possible, including a drive operating through the supporting arms 10 rather than directly from overhead. In the particular form shown in FIG. 5, studs 33 are provided on the arms 13 so that when the mechanism is lowered in its narrower form between the studs 33 and then spread out to the shapes shown in FIG. 5, it can be raised and lift the rod 13.

FIG. 6 is an illustrative example of the arrangement of a rake mechanism for advancing the parts. In this case the baskets will carry parts on each side, so that there are two loading rails 14a and two unloading rails 20. Consequently, a first rake unit 41 is located at one side of the containers 1,2,3 and 4, and a second rake unit 42 is located at the other side of the containers 1,2,3 and 4. Each of the rake units operates a set of rake rods 45. As shown for the first rake unit 41, the rods 45 are propelled by a rack 46, which is in turn moved from the position shown over to a position farther to the right by essentially the distance between adjacent rods 45, and back, by means of the pinions 47 driven by a motor 48, being geared together by means not shown which are symbolized by the shaft center line 49. The motor 48 displaces the rack 46 relative to the rack 50. The latter is displaced towards and away from the containers 1,2,3 and 4 by means of hydraulic cylinders 52 and 54. The rack 50 is guided by rails 56 on which sliders 57, affixed to the rack 50, readily move. The sliders 57 also hold the rack 46 against the pinions 47 while allowing the rack 46 to slide to the right and left.

The entire installation is put through its cycle by a control unit 60 which provides the necessary control through electric cabling 61 and may be synchronized to other manufacturing operations, including loading and unloading of the installation, by means not shown.

The cycle of operation of the rake mechanisms is as follows. The readiness position is shown in FIG. 6. When the baskets have been raised into their upper position (shown in FIG. 1) and after the arresting rods have been lifted out, as already described with reference to FIG. 5, the rakes 45 are advanced into the baskets by expelling the piston rods 62 and 64 of the respective cylinders 52 and 54, and the corresponding pistons not shown of the cylinders 53 and 55. In this operation, the racks 46 and 50 are slid forward together along the rails 56, as shown for the first rake unit 41. When the rakes have been inserted into the baskets, the motor 48 is then activated (and likewise another, not shown, in the unit 42) shifting the rack 46 to the right and displacing the rakes 45 likewise until a complete transfer operation has been effected. Thereafter the cylinders 52-55 are operated to retract their piston rods, causing the rods 45 to be withdrawn clear of the baskets as the racks go back to their positions nearest the hydraulic cylinders. Then the motor 48 and the corresponding motor (not shown) in the unit 42 are actuated to move the rods 45 back to the positions shown in FIG. 6. The latter operation can take place while at the same time the baskets are being lowered into the containers 1,2,3 and 4.

Although the invention has been described with reference to a particular illustrative embodiment, and a particular modification of the baskets thereof, it will be understood that other variations and modifications are possible within the inventive concept. In particular, the top covers shown in FIG. 6 on the rake units 41 and 42 as a device to simplify the drawings, would normally be omitted at least in part, since a continuous horizontal slot is necessary for the movement of the rods 45 if each rod is to be able to move from its rest position over to the rest position of the next rod.

We claim:

1. Mechanized method of cleaning machined parts by running them through a series of dips respectively into solvent or solvent vapor baths while being held in baskets by which the parts are lowered into and raised from each bath, in which method, according to the invention, each basket is used for dipping parts into only one of the baths of said dip series at a dip station individual to the particular basket, parts are loaded in batches at a loading station and are advanced mechanically, in the same batches, from the loading station to the several baskets of the respective dip stations in sequence and then to an unloading station, in successive advance intervals, and, between said advance intervals, the baskets are respectively dipped into said baths and the contents of the baskets thereby exposed to cleaning action thereon.

2. Mechanized method of cleaning machined parts in a series of dips into solvent or solvent vapor baths at respective dip stations by means of apparatus comprising a dip basket for each station equipped with rails for holding said parts in the basket and means for lowering and raising the basket and for agitating the same while at a dip station and also comprising sections of fixed rail means respectively located between successive pairs of said dip stations and at loading and unloading stations for interconnecting the basket rails in a raised position of the baskets to form a track for transferring said parts into and out of said baskets, said method comprising the steps of:

loading a predetermined number of said parts on a first section of said fixed rail means at said loading station;

advancing said parts, while said baskets are in said raised position so as to transfer said loaded parts at said loading station to a first basket of said baskets which is adjacent to said loading station, to transfer also the contents of each basket, except the last along said track, to the next basket along said track and to transfer the contents of said last basket to one of said fixed rail sections which is at said unloading station;

lowering said baskets into said baths and exposing said parts in said baskets to cleaning action in said baths;

raising said baskets from said baths to said raised position thereof, and repeating the foregoing steps a plurality of times, the repetition of said loading step being performed prior to the step of raising said baskets in the previous cycle.

3. Method according to claim 2 in which following the steps of lowering said baskets and prior to the next step of raising said baskets, at least the baskets in which said parts are immersed in liquid solvent baths are agitated for assuring an adequate overall washing contact between parts and liquid.

4. Method according to claim 2 in which after each advancing step and before the next lowering step the parts then in each basket are secured against movement, out of the basket within which the machined parts are located, along said rails, and after each raising step and before the next advancing step the parts are freed from restraint of their movement along said rails.

5. Apparatus for mechanized cleaning of machined parts by means of successive dips of said parts into solvent or solvent vapor baths at a succession of dipped stations, comprising:

a plurality of containers, open at the top thereof, suitable for containing an organic liquid solvent and disposed in a row;

a corresponding plurality of rigid baskets for containing batches of said parts, each of said baskets having rail-like guides enclosing spaces for holding said parts therein in positions exposed to vapor or liquid surrounding the basket, said guides being oriented in lines parallel to the row formed by said containers, said guides of the several baskets being aligned with the guides of the corresponding baskets and being shaped so that said parts may be shifted there along;

means for supporting said baskets and for raising and lowering said baskets together between respective first positions within the respective containers and second positions above said containers at the same level thereabove;

intermediate guide sections for interconnecting in a continuous track said guides of said baskets when said baskets are in said second positions thereof;

loading and unloading guide sections in fixed position aligned with said guides of said baskets when said baskets are in said second position thereof;

means for barring said guides of said baskets near the extremities of said guides just before actuation of said means for lowering said baskets, for preventing said parts from sliding out of said baskets when said baskets are not in their said second positions;

means for unbarring said guides just after said baskets reach said second positions, and means for advancing equal batches of said parts simultaneously from said loading guide into a first basket of said row of baskets, from each of said baskets except a last basket in the row thereof to the next basket in said row, and from said last basket in said row to said unloading guide.

6. Apparatus according to claim 5, in which means are provided for agitating at least all but one of said baskets during the time in which said baskets are located in said first positions thereof within said containers.

7. Apparatus according to claim 5, in which each of said baskets is provided with at least one pair of said guides, the guides of said pair being open outward at the side of said baskets, and in which said intermediate guide sections and said loading and unloading guide sections are also provided in pairs at the same level.

8. Apparatus according to claim 7, in which each of said baskets is provided with a plurality of pairs of said guides disposed one above the other, and in which said intermediate guide sections and said loading and unloading guide sections are likewise provided in pairs located one above the other.

9. Apparatus according to claim 5, in which said advancing means includes rods equipped with means for inserting said rods respectively into said guides of said baskets when said baskets are in said second positions thereof, and for thereafter substantially horizontally displacing said rods so as to propel parts along said guides and guide sections and thereafter to withdraw said rods from said baskets and return said rods to their position prior to insertion in said guides said advancing means also providing at least one rod for similarly propelling parts from said loading guide into a first one of said baskets.

10. Apparatus according to claim 5, in which said barring means include also means for barring exit from said loading and unloading guides towards said baskets when said baskets are out of said second position thereof.

11. Apparatus according to claim 9, in which said barring means include at least one rod in each basket which is substantially replaced by a rod of said advancing means just after said baskets reach their said second position.

* * * * *